(12) United States Patent
Peffer et al.

(10) Patent No.: US 8,157,380 B2
(45) Date of Patent: *Apr. 17, 2012

(54) VERTICALLY MOUNTED KALEIDOSCOPE

(75) Inventors: Patricia L. Peffer, Hendersonville, NC (US); George B. Waites, Arden, NC (US)

(73) Assignee: Patricia L Peffer, Hendersonville, NC (US)

(*) Notice: Subject to any disclaimer, the term of this patent is extended or adjusted under 35 U.S.C. 154(b) by 897 days.

This patent is subject to a terminal disclaimer.

(21) Appl. No.: 12/077,588

(22) Filed: Mar. 20, 2008

(65) Prior Publication Data

US 2008/0252982 A1 Oct. 16, 2008

Related U.S. Application Data

(63) Continuation-in-part of application No. 11/321,930, filed on Dec. 28, 2005, now Pat. No. 7,370,971.

(51) Int. Cl.
G03B 21/00 (2006.01)
G02B 27/08 (2006.01)

(52) U.S. Cl. ........... 353/1; 353/2; 359/616; 359/617; D21/403

(58) Field of Classification Search ............ 353/1, 2; 359/616, 617; D21/403
See application file for complete search history.

(56) References Cited

U.S. PATENT DOCUMENTS

| 1,196,081 | A | 8/1916 | Carence |
| 1,547,817 | A | 8/1921 | Mahoney |
| 1,914,562 | A | 5/1930 | Freeland |
| 4,077,706 | A | 3/1978 | Yaeger |
| 4,262,441 | A | 4/1981 | Wolf |
| 4,536,064 | A | 8/1985 | Schindel et al. |
| 4,815,801 | A | 3/1989 | Anderson |
| 4,964,711 | A | 10/1990 | Degnan |
| 5,094,525 | A | 3/1992 | Nelson, Jr. et al. |
| 5,146,364 | A | 9/1992 | Oku |
| 5,161,055 | A | 11/1992 | Blechschmidt |
| 5,184,249 | A | 2/1993 | Dickman |
| 6,305,808 | B1 * | 10/2001 | Ochi .................... 359/616 |
| 6,644,819 | B2 | 11/2003 | Nelson |
| 7,370,971 | B2 * | 5/2008 | Peffer et al. ............. 353/1 |
| 2006/0164728 | A1 | 7/2006 | Peffer et al. |

* cited by examiner

*Primary Examiner* — Rochelle-Ann J Blackman
(74) *Attorney, Agent, or Firm* — J. Bennett Mullinax, LLC

(57) ABSTRACT

A kaleidoscopic device is provided. In accordance with one embodiment, the kaleidoscopic device may have a housing mounted within a wall and a collection drum that has a plurality of display elements. The collection drum may be intermittently rotated and/or rotated at various speeds by a driving system that has a motor. A mirror structure may be mounted within the housing and used with the display elements in order to generate a decorative kaleidoscopic effect.

18 Claims, 9 Drawing Sheets

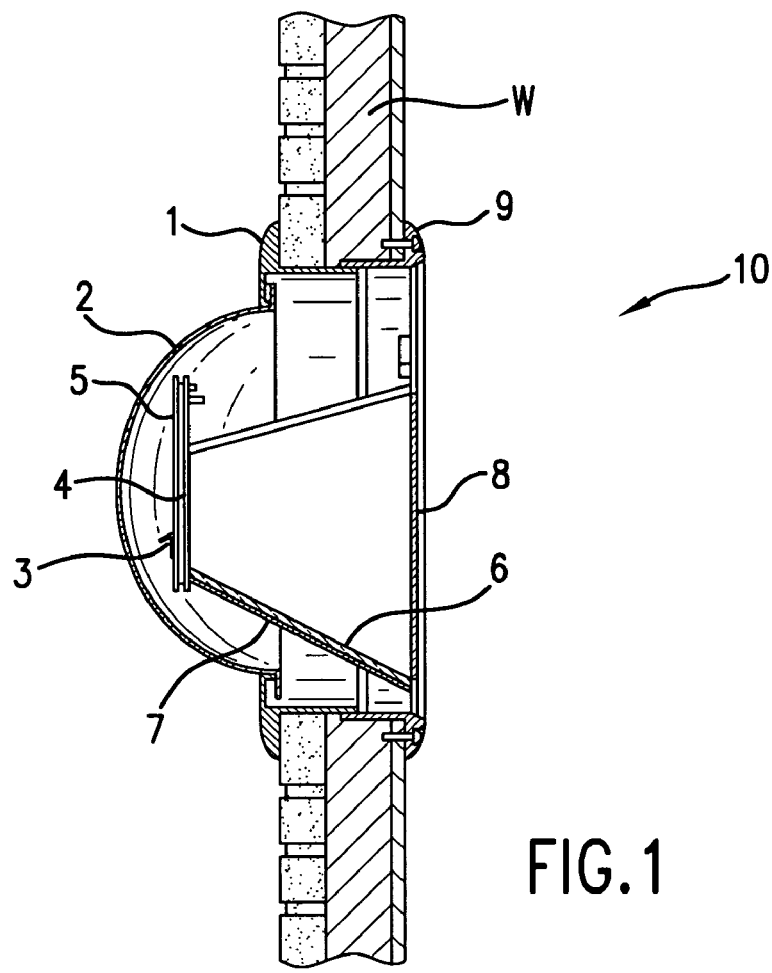
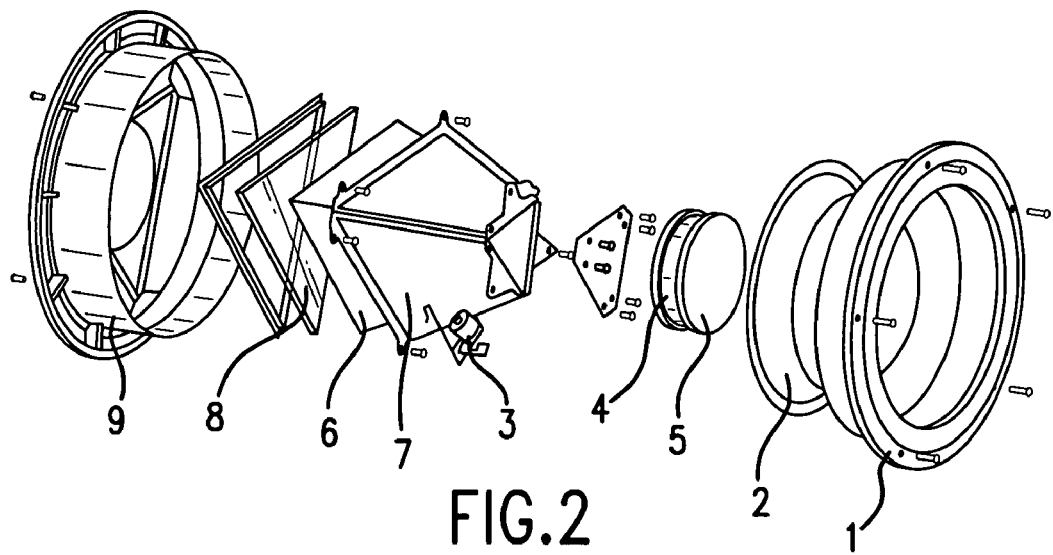

VERTICALLY MOUNTED KALEIDOSCOPE

CROSS REFERENCE TO RELATED APPLICATIONS

This application is a continuation-in-part and claims the benefit of U.S. application Ser. No. 11/321,930 filed on Dec. 28, 2005 and entitled, "Wall Mounted Kaleidoscope." U.S. application Ser. No. 11/321,930 is incorporated by reference herein in its entirety for all purposes. U.S. application Ser. No. 11/321,930 claims the benefit of U.S. Application Ser. No. 60/642,034 entitled, "Display Window Apparatus and Method." U.S. Application Ser. No. 60/642,034 is incorporated by reference herein in its entirety for all purposes.

BACKGROUND

Kaleidoscopes are known for use in providing an interesting visual display through multiple moveable reflections of objects. The principle of a kaleidoscope relies on a structure that has inside surfaces that are mirrors. The kaleidoscope also includes a collection drum for holding display elements such as colored glass or acrylic pieces. Also present in a kaleidoscope is a viewing window or portal for viewing the display. Rotation of the drum or the kaleidoscope as a whole causes shifting of the moveable elements within the drum, resulting in endlessly variable and visually interesting displays.

It is known to provide kaleidoscopes that are illuminated. In this regard, the kaleidoscope may have a triangular, tubular structure with three internally mirrored panels. A light source may be present for use in illuminating the interior of the tubular structure. It is also known to configure a kaleidoscope so that the rotation of the kaleidoscope is motorized. Additionally, it is known to project the image generated by a kaleidoscope onto a wall or screen for display.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 1 is a schematic diagram of a cross-section of a kaleidoscope mounted within a wall in accordance with one exemplary embodiment.

FIG. 2 is an exploded assembly view of the exemplary embodiment shown in FIG. 1.

Figure 3:
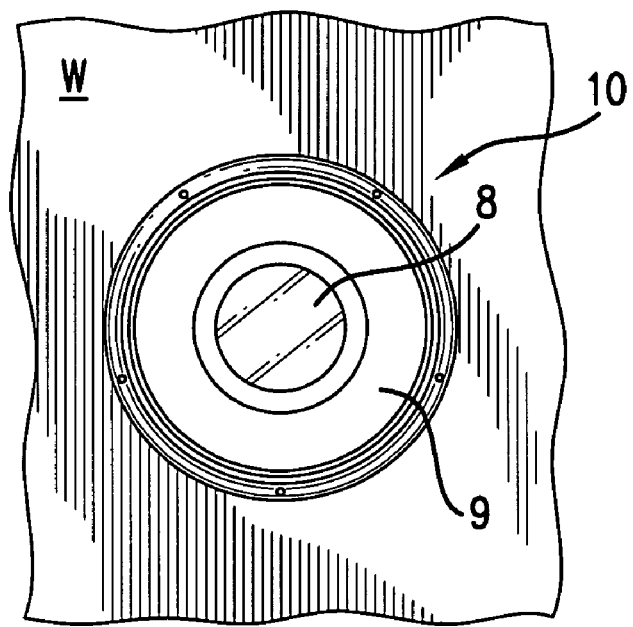
FIG. 3 is a front view of the exemplary embodiment of FIG. 1 shown mounted in a wall from the interior of the structure.
Figure 4:
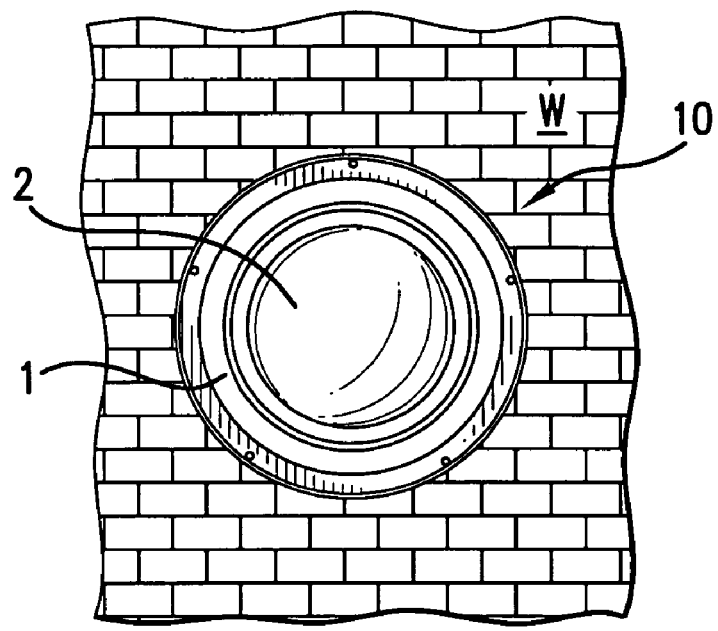
FIG. 4 is a back view of the exemplary embodiment of FIG. 1 shown mounted in a wall from the exterior of the structure.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention may provide for a kaleidoscope for permanent mounting within the wall of a building, residence or other similar structure, to provide a visually interesting illuminated kaleidoscope display visible within the interior of the structure. Although used for providing a kaleidoscopic display within the interior of a structure, the kaleidoscope may be installed so that the kaleidoscopic display is visible from the exterior of the structure. The device is intended to be mounted within an opening within the wall or other window, although it will be seen that the device may be mounted within other structural components, including ceilings and roofs, etc. The term "wall" herein (including in the claims) refers to any suitable building component. Directional references herein such as "up" and "down" are for convenience of description as the device may be oriented in any direction. For convenience, the device as described in certain exemplary embodiments is described in the orientation when mounted within a vertical wall.

In accordance with one aspect, a tubular kaleidoscope housing, suitable for mounting within a wall structure and extending entirely through the wall from the interior to exterior is provided. Optionally, the exterior exposed end of the structure is covered with a clear or translucent covering to seal the structure against the elements. A kaleidoscope mirror structure may be mounted within the housing. Optionally, an illumination source may be provided to ensure a clear kaleidoscope display. Additionally or alternatively, the system may rely on natural light from the exterior of the structure. In this regard, the present system may be incorporated into a wall of a structure that is exposed to natural illumination. Alternatively, the kaleidoscope may be installed within an interior wall so that both respective ends of the housing are within the building interior. Regardless, the term "exterior" refers to the first side of the housing normally intended for facing the building exterior and which does not receive a kaleidoscope display. "Interior" refers to the end of the structure from which one may view the kaleidoscope display.

The interior face of the kaleidoscope housing is optionally covered with a clear plate and the exterior part may be covered with a weather-tight, light-transmissible covering which may be domed to accommodate a protruding mirror structure. The kaleidoscope mirror system may have three mirrors arranged in the shape of a triangular truncated pyramid having an open base and apex and oriented on a horizontal axis so that the side that forms the base of the pyramid is on a vertical plane when mounted within a vertical wall. In this arrangement, the apex faces the building exterior and the open base faces the building interior to provide viewing of the kaleidoscope display. Display elements such as loose articles like pieces of colored glass or acrylic may be placed within a collection drum capable of rotating. The collection drum may be located beyond the kaleidoscope mirror system at the apex end of the triangular truncated pyramid. Rotation of the drum causes movement of the articles within the collection drum, thereby providing an endlessly shifting kaleidoscope display visible to a viewer within the interior of the building. Rotation is optional and the device may comprise a non-rotatable drum in accordance with one exemplary embodiment.

An intermittent feature may be included so that the collection drum will rotate intermittently. The time duration of rotation and stopping may be varied as desired. Alternatively, the kaleidoscope may be arranged so that the collection drum rotates continuously in accordance with certain exemplary embodiments. Although described as being mounted within the wall of a structure, the kaleidoscope may be mounted within a vertical frame that is not part of a structure. In this regard, the vertical frame may be capable of being moved about the room or transported to various locations for display. In accordance with still further exemplary embodiments, one or more themed sets of display elements can be provided so as to achieve a desired mood or themed kaleidoscopic display.

One exemplary embodiment of a kaleidoscope device is shown schematically in FIG. 1 at reference numeral 10. This exemplary embodiment includes an exterior bezel 1 that extends through a wall "W", exterior dome 2, an electric motor 3 to actuate a collection drum 4, collection lid 5, three mirrors 6 that are held in position by the mirror brackets 7, a viewing window 8 to enable visibility of the collection drum 4, and an interior bezel 9 that extends through the wall "W."

The mirror structure 6 is configured as a truncated four sided pyramid with the base being parallel to the plane of the wall "W." The base is open, but is optionally covered with a transparent window 8 as will be momentarily discussed. The tapered shape of the mirror structure permits a relatively broad and shallow structure such that the base is relatively large to provide an acceptable viewing area. However, the overall depth of the mirror structure is made to be relatively shallow in order to minimize protrusion from the wall "W."

An interior bezel 9 is attached to the interior surface of the wall "W" holding the viewing window 8, the three mirrors 6, and the three mirror brackets 7 in place. This forms a seal against the interior bezel 9. The collection drum 4 and collection lid 5 which hold the display elements are mounted via rollers to the mirror brackets 7. Machinery extends between the collection lid and the viewing window 8. The collection drum 4 contains a plurality of display elements that form visually attractive images or designs as, for instance, in a kaleidoscope. The display elements may include shards or forms of predetermined shapes. The display elements may be fabricated from colored glass, plastic, foil, etc. in accordance with certain exemplary embodiments.

The drum structure 4 may be rotated by a rotation means such as a small electric motor 3. However, any suitable motor-driven or manually-operable rotation means may be employed in accordance with other various embodiments.

The motor 3 rotates a wheel that rotates the collection drum through a drive system (not shown) such as a gear system, a belt-and-pulley system, or another type of drive system. Depending upon the configuration of the display elements within the collection drum 4, as the collection drum 4 rotates the display elements may change position and form any one of a plurality of designs or images.

A viewer (not shown) may view the collection drum 4 and the display elements therein through the viewing window 8. Natural or artificial light can pass through the collection drum 4 in order to illuminate the display elements for viewing through the viewing window 8. Natural light, such as sunlight or moonlight, and/or outdoor artificial light (not shown) may pass through the exterior dome 2 and through the collection drum 4. However, such lights may be unavailable or insufficient to illuminate the display elements in the collection drum 4 to the satisfaction of the viewer. Therefore, an artificial light (not shown in FIG. 1) may be provided adjacent the collection drum 4. The artificial light may be switched off and on by the viewer either by remote control and/or be photosensitive.

The interior bezel 9 is a facing frame on the inside wall "W" and surrounds the viewing window 8 and attaches to the mirror brackets 7 that hold the three mirrors 6 in position suspended in the interior of the wall. The three mirrors 6 are displayed along the length of the tube created by the interior bezel 9 and the exterior bezel 1 in an equilateral triangle configuration. The housing may be formed by the bezels 1 and 9 and/or the mirror structure 6. Further, the housing may be formed by brackets holding the mirror structure 6 together. Still further, the housing may be formed by any other component or components of the kaleidoscopic device 10.

The exterior dome 2 and exterior bezel 1 may be attached to the exterior wall providing a seal to keep out dust, humidity, insects, etc. The exterior dome 2 may be latched to the exterior bezel 1. The exterior bezel 1 may be screwed and caulked or grouted to the exterior of the wall 14. Both the exterior bezel 1 and the exterior dome 2 may function to keep out dust, humidity, insects, etc. The exterior dome 2 may be unlatched for maintenance if desired. The apparatus 10 may be installed in an exterior or outside wall of any type of structure, including, without limitation, homes, offices, churches, retail stores, special event venues, and conference/meeting facilities. The apparatus 10 may also be provided in an interior wall and make use of artificial light.

A method of constructing and using the device may be practiced by providing and assembling a window as described above. One may then look through the window and actuate the motor 3 to rotate the collection drum 4 to create desirable images and designs for viewing.

Figure 5:
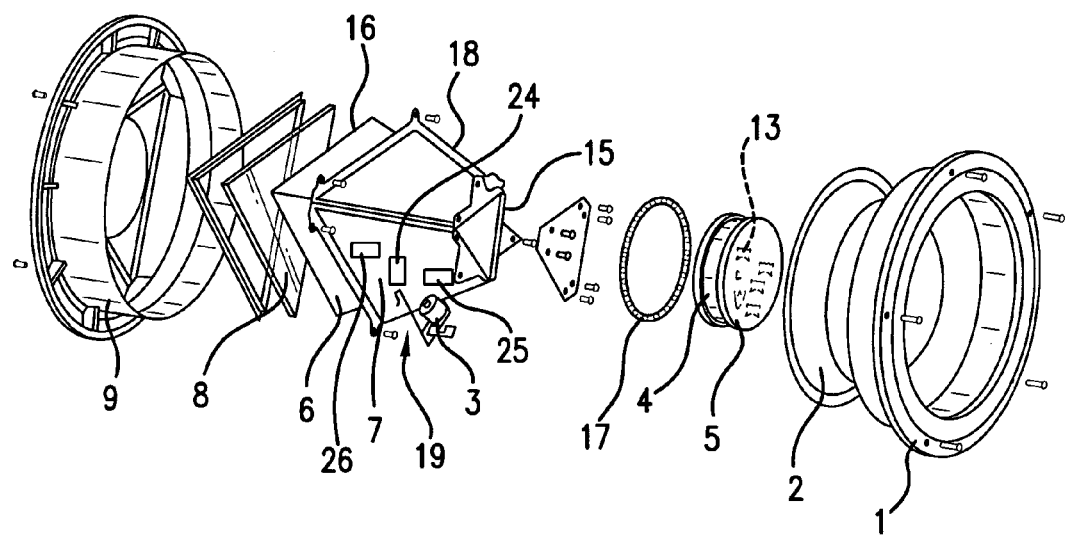
FIG. 5 is an exploded assembly view of a kaleidoscope in accordance with an alternative exemplary embodiment.

FIG. 5 illustrates an alternative exemplary embodiment of the kaleidoscope device 10. Here, a light emitting diode (LED) rope 17 is present and is located proximate to the collection drum 4. The LED rope 17 may be turned on to provide artificial illumination of display elements 13 in the collection drum 4 so as to enhance the resulting kaleidoscopic effect. The use of LEDs 17 results in less heat and power generation in addition to increased lighting than regular light bulbs. However, it is to be understood that regular light bulbs may be used in addition to or alternatively to the LEDs 17 in accordance with other exemplary embodiments.

The kaleidoscope device 10 is also provided with a driving system 19 that is capable of causing rotation of the collection drum 4 in order to produce a pleasing visual display through reorientation of the display elements 13. The driving system 19 may be arranged so that the collection drum 4 can be rotated at different speeds. For instance, the driving system 19 may be set up so that the collection drum 4 can be rotated at various speeds resulting in four different rotations per minute. However, it is to be understood that the driving system 19 may be variously arranged so that the collection drum 4 can be rotated at up to twenty different speeds in accordance with other exemplary embodiments.

The driving system 19 may include components such as control logic 24 that is capable of controlling the speed of a stepping motor 3 so that the resulting rotational speed of the collection drum 4 may be varied. The control logic 24 may also be arranged so that the collection drum 4 can be intermittently rotated. In this regard, the collection drum 4 can be rotated for a certain amount of time and then stopped. After a particular amount of time has passed, the collection drum 4 may again resume rotation for another period of time. With such an arrangement, a viewer can see various kaleidoscopic images for certain amounts of time until a new image is generated. The duration of the intermittent motion may be variously selected. For instance, the amount of rotation and non-rotation may be 15 seconds, 7.5 seconds, 3.38 seconds, or 1.80 seconds in accordance with certain exemplary embodiments. Although described as employing control logic 24 to establish intermittent motion and speed variation, the kaleidoscopic device 10 can be arranged in other exemplary embodiments differently to achieve these features. For instance, a transmission may be employed between the motor 3 and the collection drum 4 to achieve intermittent motion and/or speed variation.

The kaleidoscope device 10 may include a housing 18 to which a mirror structure 6 is mounted. The mirror structure 6 may have various numbers of mirrors. For example, in accordance with certain exemplary embodiments, the mirror structure 6 may have three or more mirrors. In accordance with other exemplary embodiments, the mirror structure 6 may have two or more mirrors. In accordance with the exemplary embodiment illustrated in FIG. 5, the mirror structure 6 has three mirrors mounted through the use of the housing 18. The mirrors may each be provided in the shape of an equilateral triangle. The mirror structure 6 has a first end 15 and a second end 16. The kaleidoscopic device 10 may be oriented so that the direction from the first end 15 to the second end 16 is the same direction as the direction from the exterior surface 11 to the interior surface 12 of a wall 14 to which the kaleidoscopic device 10 is mounted. The wall 14 may be an exterior wall of a structure. Other arrangements are possible. For example, the kaleidoscopic device 10 can be oriented so that the direction from the first end 15 to the second end 16 is in the same direction as that from the interior surface 12 to the exterior surface 11 of the wall 14 to which the kaleidoscopic device 10 is mounted which may be an exterior wall of a structure.

Other electronic components may be incorporated into the kaleidoscopic device 10. For example, the kaleidoscopic device 10 may include a surge protector 26 to protect the various electrical components from power surges coming from the power supply feeding the kaleidoscopic device 10. Further, solar power may be used to drive the motor 3 and hence the collection drum 4 and light the artificial lights 17. Additionally or alternatively, a battery 25 may be included in the kaleidoscopic device 10. The battery 25 may be used to drive the motor 3 so that the collection drum 4 can rotate when electrical power is disrupted as may be the case, for example, in a storm. The battery 25 also allows the kaleidoscopic device 10 to be mobile so that its collection drum 4 can rotate when the kaleidoscopic device 10 is moved to a location out of electrical service range. Further, solar power may be used to drive the motor 3 and hence the collection drum 4. The battery 25 can act as a back-up or supplementary source of electrical power or may be employed during the evenings or on cloudy days when sunlight is not present.

Figure 6:
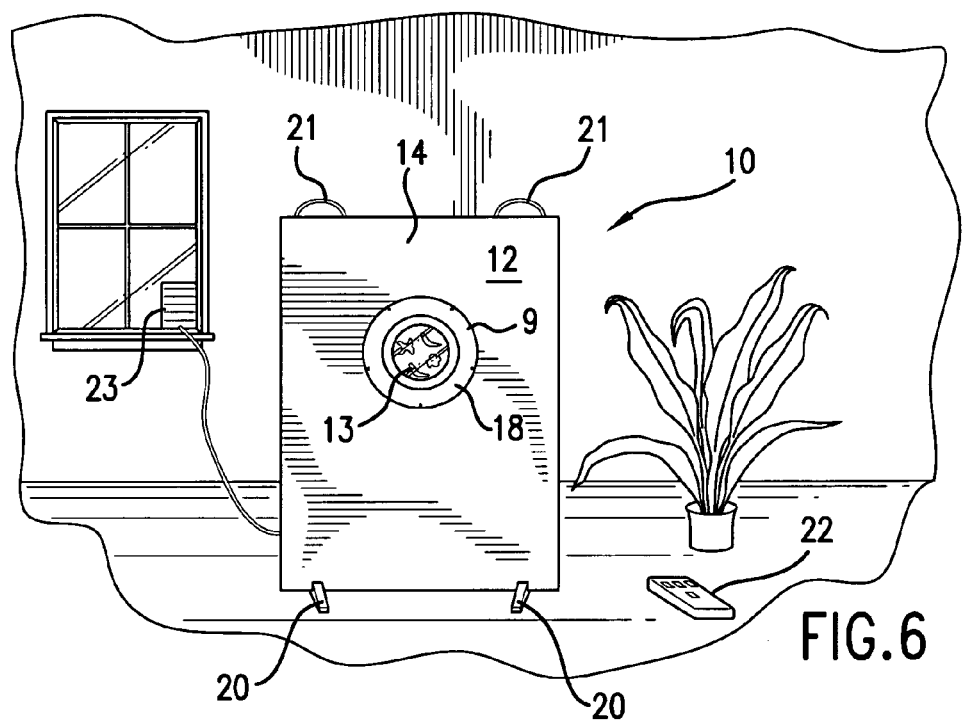
FIG. 6 is a front view of a kaleidoscope configured as a stand alone unit in accordance with another exemplary embodiment.
Figure 7:
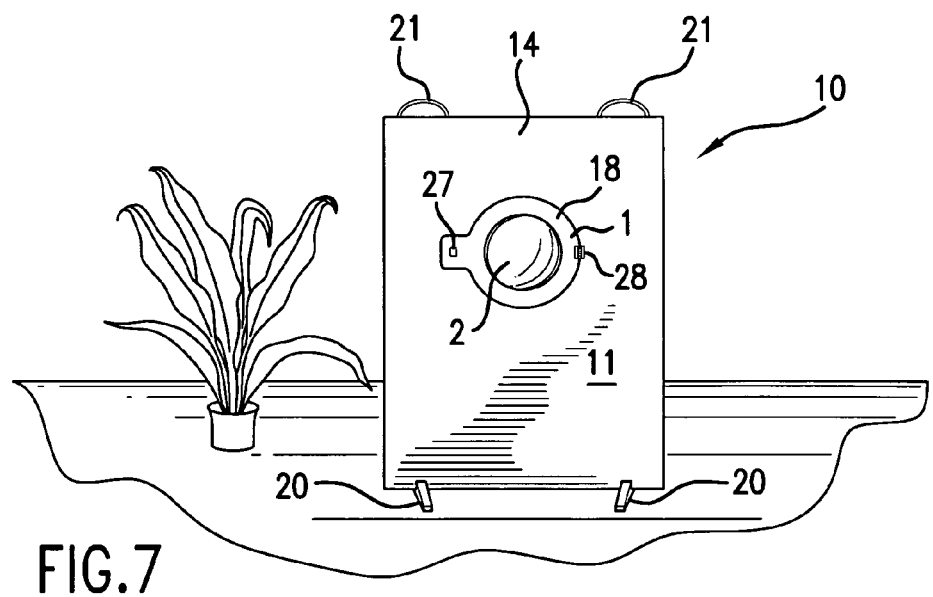
FIG. 7 is a back view of the kaleidoscope of FIG. 6.

An alternative exemplary embodiment of the kaleidoscopic device 10 is illustrated in FIGS. 6 and 7. Here, the kaleidoscopic device 10 is incorporated into a wall 14 that is not a wall of a structure. Instead, the kaleidoscopic device 10 is a free standing unit that can be moved around the interior of a structure to different places as desired. Further, the kaleidoscopic device 10 may be taken outside or transported to various events away from the building. The wall 14 has a first surface 11 and a second surface 12. The kaleidoscopic device 10 incorporates a housing 18 mounted to the wall 14. In accordance with one exemplary embodiment, the housing 18 has a first bezel 1 and a second bezel 9. However, it is to be understood that the housing 18 may be variously configured in accordance with other exemplary embodiments in order to mount the mirror structure 6 to the wall 14.

The wall 14 may be made out of a variety of materials. For example, the wall 14 may be made out of fiberboard, wood, metal or plastic in accordance with certain versions of the kaleidoscopic device 10. Feet 20 may be included in order to stabilize the wall 14. Additionally, one or more handles 21 can also be attached to the unit to aid during transport. The kaleidoscopic device 10 is shown as being powered through the use of a solar power unit 23 that is positioned within a window of the building. As previously mentioned, various types of power may be present in order to power the motor 3 to drive the collection drum 4 and any LEDs 17 that may be present. The solar power unit 23 may be used alternatively to or in addition to the battery 25 and standard A/C current from a building's electrical outlet in accordance with various exemplary embodiments.

A remote control 22 is illustrated for use in activating the kaleidoscopic device 10. The remote control 22 may have buttons located thereon that can be depressed in order to turn on and off LEDs 17 present in the device 10 in order to provide artificial illumination for the display elements 13. The remote control 22 may also have one or more buttons that can be pressed in order to change the rotation speed of the collection drum 5. Additionally, the remote control 22 can be actuated so that the collection drum 5 can be rotated intermittently at different lengths of time. Further, the remote control 22 can be arranged so that a pulse feature is realized. In this regard, a user may depress a button on the remote control 22 during which time the collection drum 4 rotates. Once a desired visual display is realized, the user may release the pulse button so that the collection drum 4 stops rotation and the desired visual display is left for view. The various functionalities of the remote control 22 may be achieved through communication of the remote control 22 with the driving system 19 that includes the variously described features such as the control logic 24, motor 3, LEDs 17, and collection drum 4. Although described as being incorporated into a remote control 22, it is to be understood that the various controls may be located on the wall 14 or other portion so as to control the various components of the kaleidoscope device 10.

A latch 27 may be unlatched by a user in order to swing the exterior dome 2 to an open position on a hinge 28. The user can thus access interior components of the kaleidoscopic device 10 for maintenance or cleaning if needed. The device 10 may also be arranged so that it is not capable of being opened. For instance, a latch with a lock may be installed. The device 10 can be made larger or smaller. For example, the device 10 can be miniaturized so that it is capable of sitting on top of a coffee table of the user. Further, the device 10 can be located inside of an existing window of the building. In this regard, the device 10 may sit within the window of the building in a manner similar to that of a window-mounted air conditioning unit.

Various components may or may not be present in accordance with various exemplary embodiments. For example, the device 10 need not include a lens in certain exemplary embodiments. The transparent window 8 may be clear and capable of being easily seen through while the exterior dome 2 is frosted such that light may pass through but it cannot be seen through. The clear transparent window 8 may be useful in preventing dust from entering the interior of the mirror structure 6.

Figure 8:
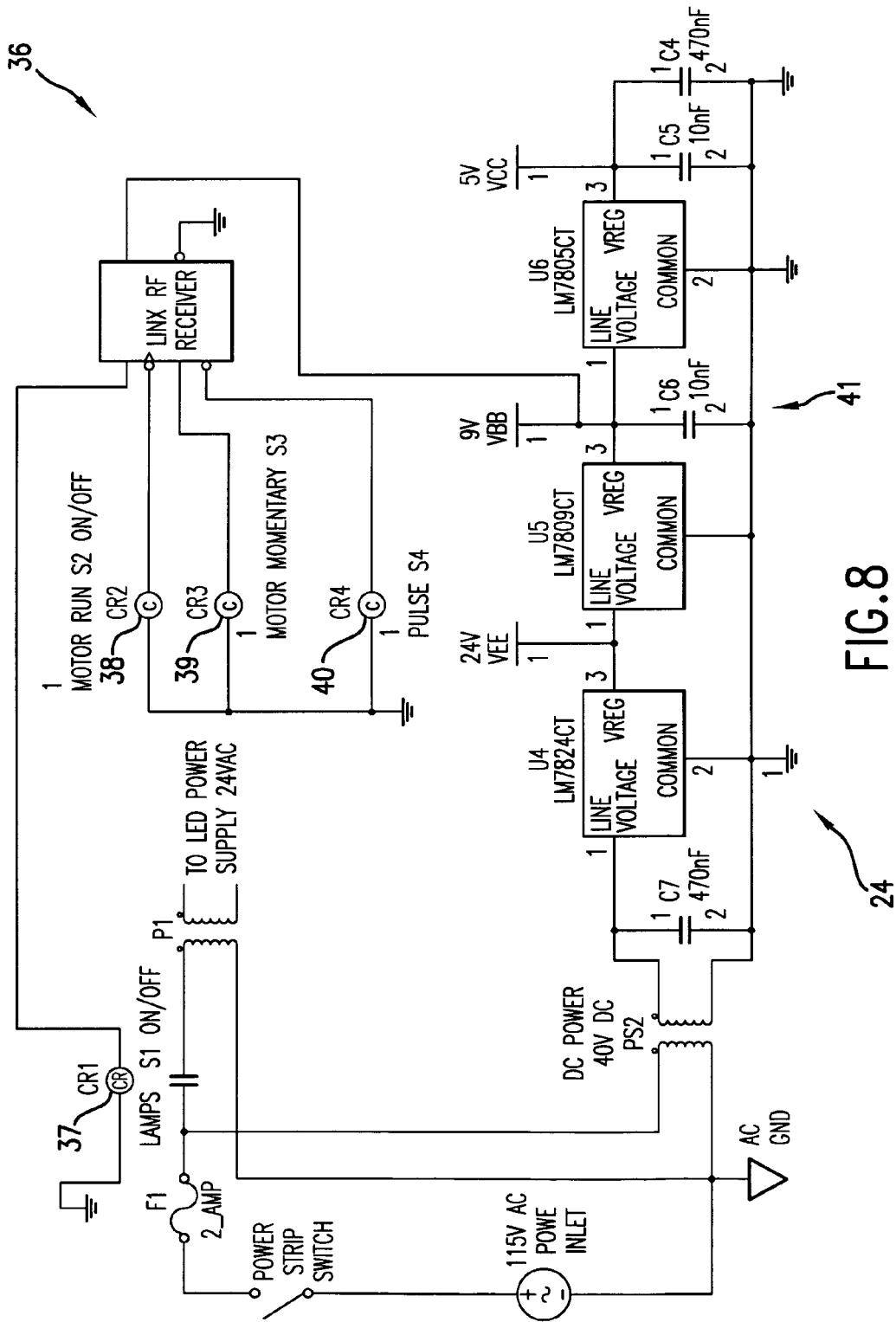
FIG. 8 is a schematic electrical circuit diagram of the power distribution in accordance with one exemplary embodiment.

A power distribution circuit 36 of the control logic 24 in accordance with one exemplary embodiment is shown in FIG. 8. Four controller relays 37, 38, 39 and 40 are present and are activated by a user upon switching or pressing a button on the remote control 22. Also, a series of voltage regulators 41 are included for use in supplying various voltage levels to other electronic components in the system as desired.

Figure 9:
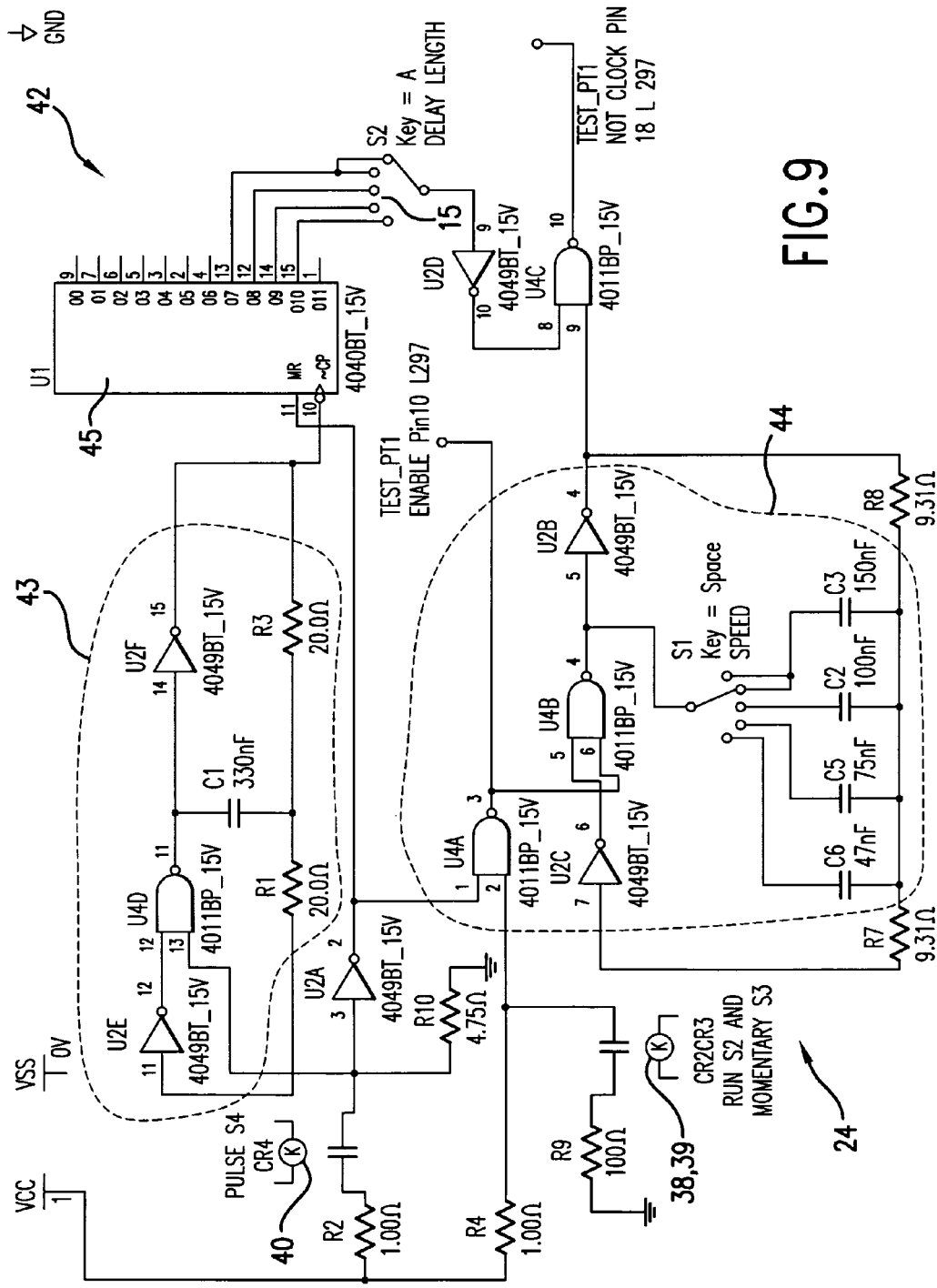
FIG. 9 is a schematic electrical circuit diagram of the motor speed and delay circuit signals in accordance with one exemplary embodiment.

FIG. 9 is a motor speed and delay circuit 42 of the control logic 24 in accordance with one exemplary embodiment. This circuit 42 responds to selections of the controller relays 37, 38, 39 and 40 by the user. The motor speed and delay circuit 42 is present in order to provide signals to the stepping motor 3 so that the speed and intermittent functionality of the stepping motor 3 is realized. The circuit 42 includes a first oscillator 43 that has a NAND gate, a capacitor, two resistors, and a pair of invertors. The first oscillator 43 converts a high voltage in to a low voltage out. The range may be from 0-5 volts in accordance with certain exemplary embodiments. Signals from the first oscillator 43 are input into a binary counter 45. The binary counter 45 functions to measure an input signal and based on this signal output a specific time therefrom.

The motor speed and delay circuit 42 also includes a second oscillator 44 that may have a pair of NAND gates, a pair of invertors, and four selectable capacitors. The capacitors allow for different frequency selections. The second oscillator 44 is responsible for sending an input signal to the stepping motor 3 in order to control the speed of the stepping motor 3. Combined signals from the first oscillator 43 and the second oscillator 44 are responsible for generating the pulse or intermittent functionality of the stepping motor 3.

Figure 10:
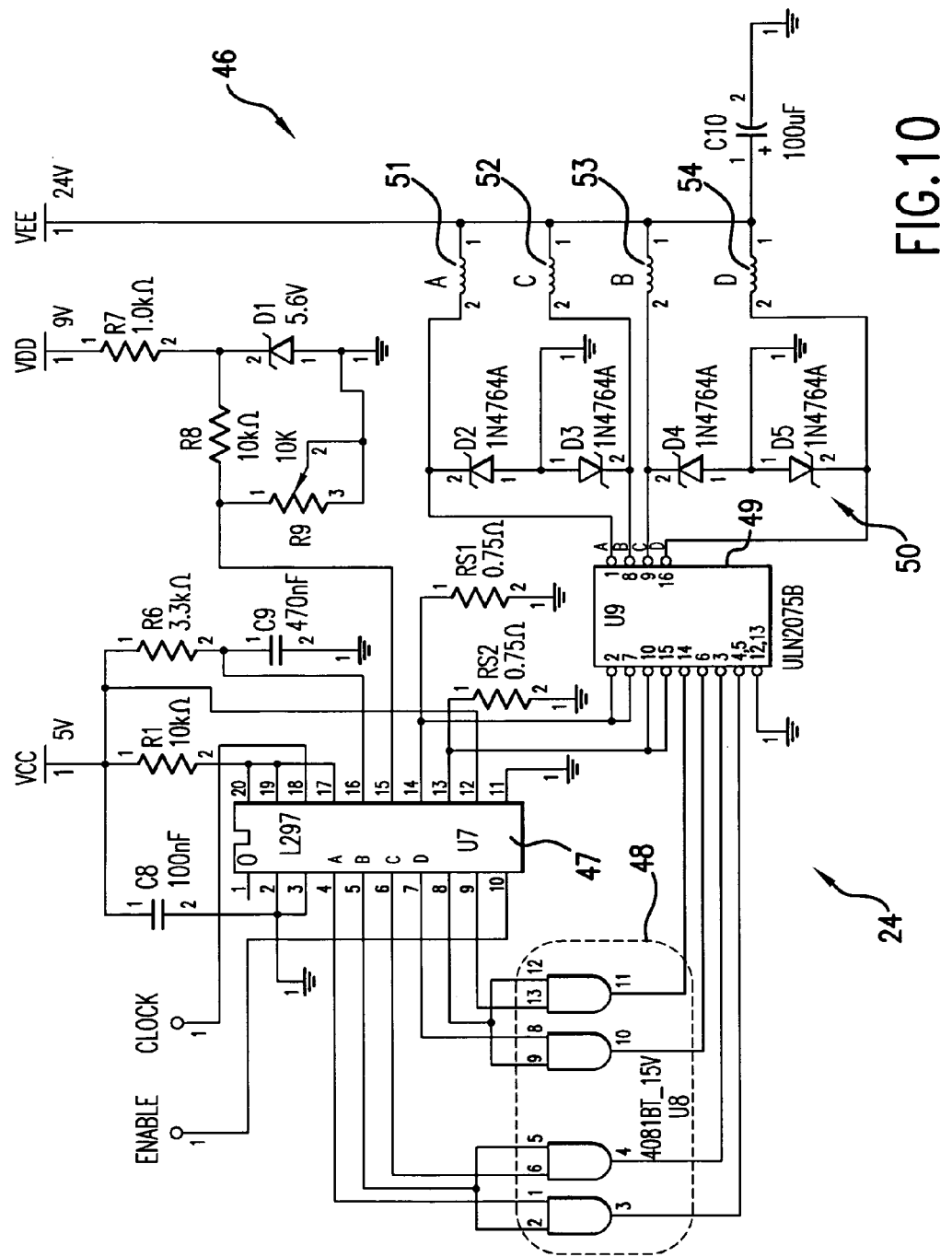
FIG. 10 is a schematic electrical circuit diagram of the motor drive circuit in accordance with one exemplary embodiment.

The stepping motor 3 is caused to actuate in a particular manner by signals from the motor speed and delay circuit 42. A motor drive circuit 46 is illustrated in FIG. 10 in accordance with one exemplary embodiment. The circuit 46 includes a plurality of AND gates 48 and a stepping motor control IC 47 that functions to set up the proper sequence. Input from these components are fed into a Darlington quad driver 49 that functions to regulate the correct amount of power to the circuit. A plurality of diodes 50 are also present and function like shock absorbers so as to dampen electrical spikes in the circuit 47. The stepping motor 3 will turn at a desired speed based upon use of stepping motor coils 51, 52, 53 and 54.

Although shown and described as using a stepping motor 3 and control logic 24 to achieve intermittent motion and speed control, it is to be understood that this arrangement is only exemplary and that others are possible. For example, a microprocessor may be employed in order to achieve the aforementioned properties. Further, a rheostat may be provided in order to help vary the speed of the motor 3 so that the collection drum 4 will thus rotate at a desired rpm. A rheostat dial may be used to change the rotation speed of the collection drum 4. Additionally, another rheostat dial can be turned so that the collection drum 4 can be rotated intermittently, at different lengths of pause time. The various functionalities of the remote control 22 and the rheostat dials may be achieved through communication of the remote control 22 and rheostat dials with the driving system 19.

The collection drum 4 may be filled with a plurality of display elements 13 that may be acrylic pieces or can be colored glass fragments in accordance with certain exemplary embodiments. The collection lid 5 may be capable of being opened so that a user can replace the display elements 13 as desired. However, it is to be understood that other arrangements are possible in which the collection drum 4 is sealed so that one cannot replace or otherwise access the display elements 13 contained therein. Here, one may replace the entire sealed collection drum 4 with another one containing a different themed set of display elements 13.

Figures 11, 12, 13, 14:
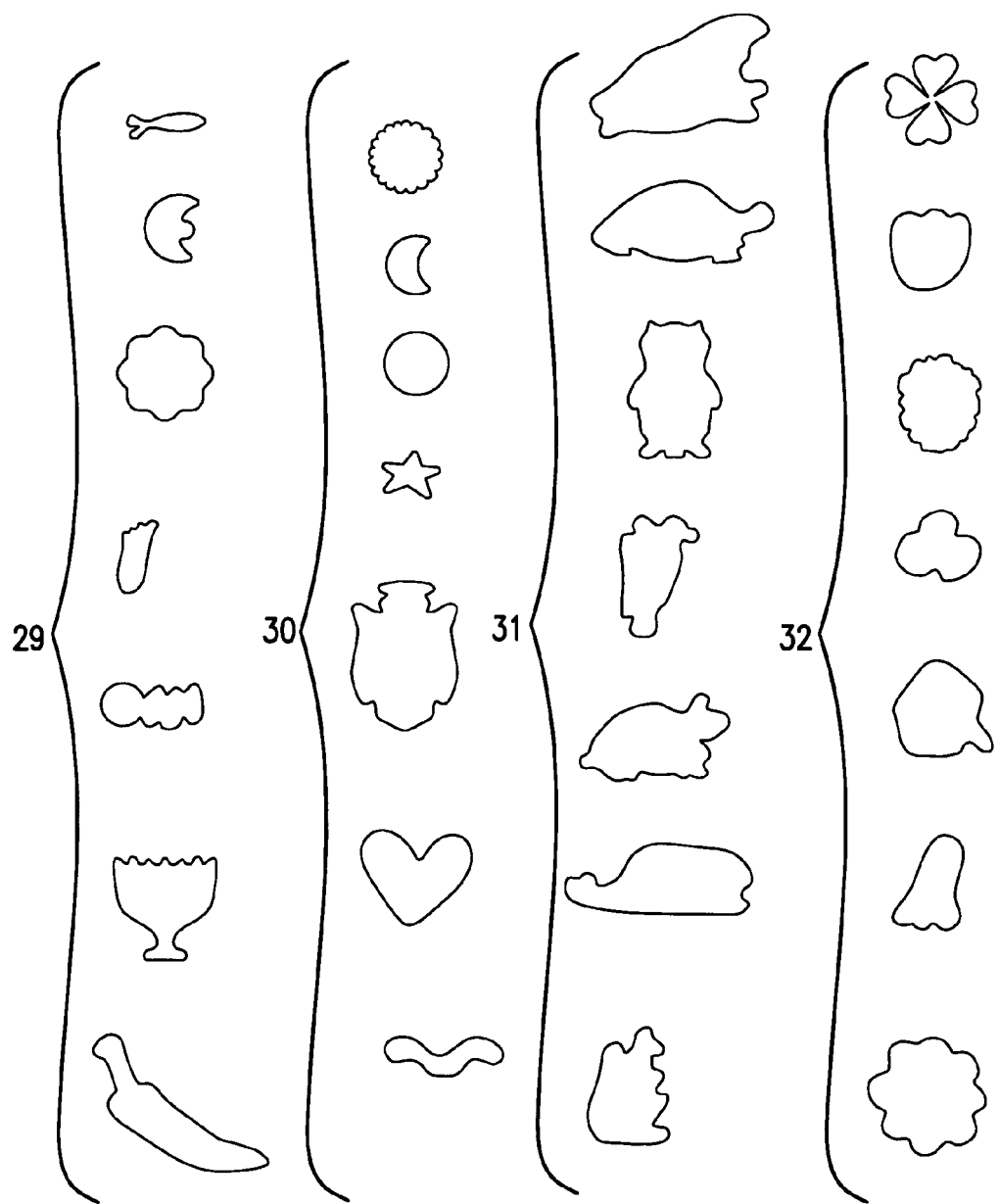
FIGS. 11-17 are front views of various sets of display elements in accordance with various exemplary embodiments.

The display elements 13 may be provided in sets so that all of the display elements 13 are related to one another in accordance with a certain theme. The kaleidoscopic device 10 may thus be able to generate displays that all illustrate a common theme. FIG. 11 includes a set of display elements 13 that are all religious in nature. The religious set 29 has display elements in the shape of a fish, star and crescent moon, nine-pointed star, Buddha's footprint, Om, Menorah and Kirpan ceremonial knife. The spiritual set 30 is illustrated in FIG. 12. Spiritual set 30 has display elements 13 that are in the shape of a sun, moon, Earth, star, angel, heart and bird. An animal set 31 is shown in FIG. 13. The animal set 31 has display elements in the shape of a walrus, turtle, owl, humming bird, pig, whale and kangaroo.

Figure 15:
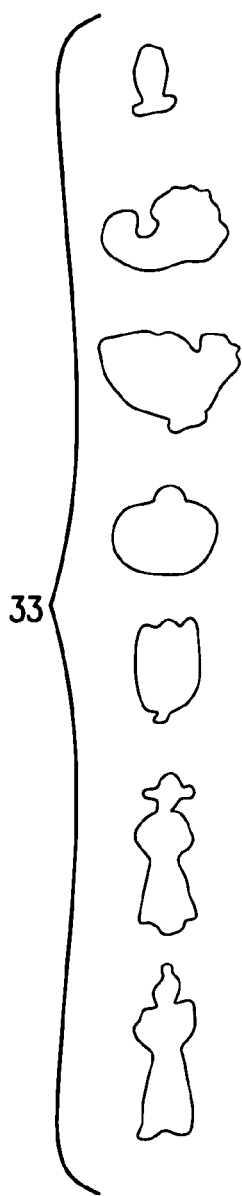
Figure 16:
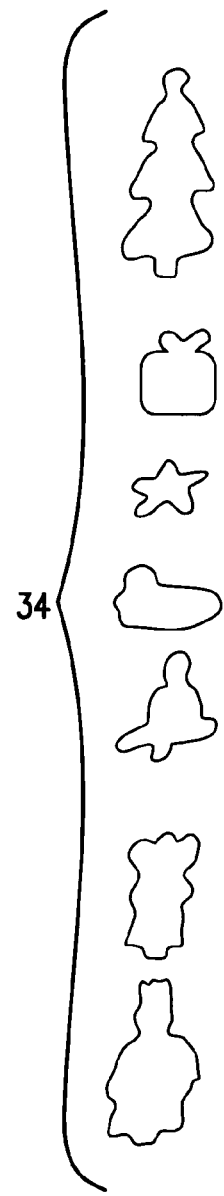
Figure 17:
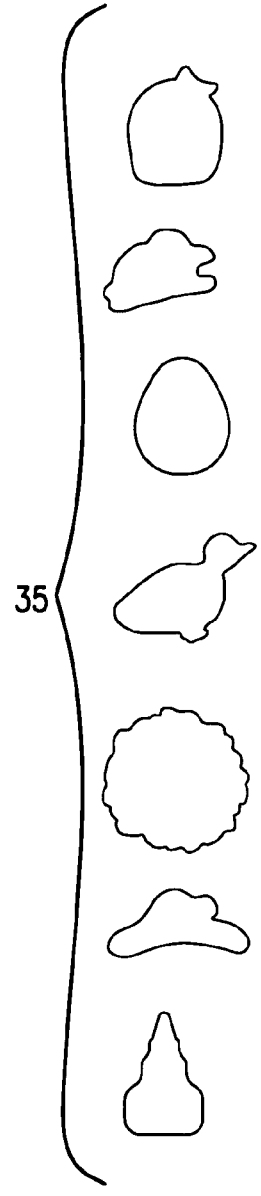

FIG. 14 shows another themed set 32 of display elements 13 in accordance with another exemplary embodiment. Here, the themed set 32 is flower based and includes shapes that are dogwood, tulip, zinnia, pansy, morning glory, lily-of-the-valley and clematis. A Thanksgiving theme can be provided by a Thanksgiving set 33 as illustrated in FIG. 15. Here, the display elements 13 may be praying hands, horn-of-plenty, turkey, pumpkin, corn, pilgrim and an Indian. Another holiday-based theme is illustrated in FIG. 16 as a Christmas set 34. The Christmas set 34 includes a Christmas tree, gift, star, baby Jesus, bell, angel and wise man. An Easter set 35 is shown in FIG. 17 and includes a basket, bunny, egg, candy chick, sunrise, bonnet and church.

The various display elements 13 may be made from many different types of materials and may be in a variety of colors. Further, although described as being theme based, it is to be understood that the display elements 13 need not all belong to a particular theme in accordance with various exemplary embodiments.

Although not shown in the figures, a colored sheet of polarized film may be incorporated into the kaleidoscopic device 10. In this regard, the polarized film may be located in front of the transparent window 8 so that the viewer will look through the polarized film into the kaleidoscopic display generated within the mirror structure 6. The polarized film may act to cause the kaleidoscopic display to have a different color so as to produce a different overall effect.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A kaleidoscopic device, comprising:
   a housing mounted within an opening of a wall, wherein the opening of the wall extends from a first vertical surface of the wall to a second vertical surface of the wall;
   a collection drum containing therein a plurality of display elements; and
   a mirror structure mounted within the housing, wherein the mirror structure and the display elements of the collection drum are used for generating a decorative kaleidoscopic effect;
   wherein the first vertical surface of the wall is an exterior surface and wherein the second vertical surface of the wall is an interior surface, wherein the mirror structure has a first end that is oriented towards the exterior vertical surface of the wall and wherein the mirror structure has a second end that is oriented towards the interior vertical surface of the wall, wherein the collection drum is located at the first end of the mirror structure.

2. The kaleidoscopic device as set forth in claim 1, wherein the mirror structure has three mirrors arranged in a pyramid shape with an open bottom, wherein the mirror structure is arranged so that the direction from an apex of the pyramid shape to the open bottom of the pyramid shape is oriented in the same direction as the direction from the exterior vertical surface of the wall to the interior vertical surface of the wall.

3. The kaleidoscopic device as set forth in claim 1, further comprising a dome located at an end of the kaleidoscopic device that is attached by a hinge and that can be swung on the hinge from a closed position to an open position, and further comprising a latch that can engage the dome in order to keep the dome at the closed position and that can disengage the dome in order to allow the dome to be swung to the open position.

4. A kaleidoscopic device, comprising:
   a housing mounted within an opening of a wall, wherein the opening of the wall extends from a first vertical surface of the wall to a second vertical surface of the wall;
   a collection drum containing therein a plurality of display elements; and
   a mirror structure mounted within the housing, wherein the mirror structure and the display elements of the collection drum are used for generating a decorative kaleidoscopic effect;
   wherein the wall is free standing and is capable of being moved by a user around the interior of a structure.

5. The kaleidoscopic device as set forth in claim 1, further comprising a motor for use in rotation of the collection drum, wherein the collection drum is capable of being paused and intermittently rotated.

6. The kaleidoscopic device as set forth in claim 1, wherein the housing has a first bezel configured for engaging the first vertical surface of the wall, and wherein the housing has a second bezel configured for engaging the second vertical surface of the wall.

7. The kaleidoscopic device as set forth in claim 1, further comprising a light emitting diode (LED) rope for use in providing artificial illumination, wherein the LED rope is located proximate to the collection drum.

8. A kaleidoscopic device, comprising:
   a housing mounted within an opening of a wall;
   a collection drum containing therein a plurality of display elements, wherein the collection drum is capable of being rotated;
   a driving system configured for rotating the collection drum, wherein the driving system has a motor, wherein the driving system is configured for rotating the collection drum at various speeds, and wherein the driving system is configured for rotating the collection drum at different periods of time intermittently; and
   a mirror structure mounted within the housing, wherein the mirror structure and the display elements of the collection drum are used for generating a decorative kaleidoscopic effect.

9. The kaleidoscopic device as set forth in claim 8, wherein the wall is free standing and is capable of being moved by a user around the interior of a structure, wherein the wall has a plurality of feet thereon for use in stabilizing the wall.

10. The kaleidoscopic device as set forth in claim 8, wherein the motor of the driving system is a stepping motor, and wherein the driving system has control logic capable of actuating the stepping motor so as to vary the speed of the stepping motor and to intermittently drive the stepping motor, wherein the collection drum is caused to be intermittently rotated and is caused to have varying rotation speeds based upon associated actuation of the stepping motor.

11. The kaleidoscopic device as set forth in claim 8, wherein the driving system has a battery, and wherein the driving system has a surge protector, further comprising a plurality of LEDs configured for providing artificial illumination to the collection drum.

12. The kaleidoscopic device as set forth in claim 8, wherein the wall is a ceiling of a structure.

13. A kaleidoscopic device, comprising:
   a housing mounted within an opening of a wall;
   a collection drum containing therein a plurality of display elements, wherein the collection drum is capable of being rotated;
   a driving system configured for intermittently rotating the collection drum, wherein the driving system has a motor;
   a mirror structure mounted within the housing, wherein the mirror structure and the display elements of the collection drum are used for generating a decorative kaleidoscopic effect; and
   wherein the driving system is capable of being actuated through the use of a remote control.

14. A kaleidoscopic device, comprising:
   a housing mounted within an opening of a wall;
   a collection drum containing therein a plurality of display elements, wherein the collection drum is capable of being rotated;
   a driving system configured for intermittently rotating the collection drum, wherein the driving system has a motor;
   a mirror structure mounted within the housing, wherein the mirror structure and the display elements of the collection drum are used for generating a decorative kaleidoscopic effect; and
   wherein the driving system is solar powered.

15. A kaleidoscopic device, comprising:
   a housing mounted within an opening of a vertical wall;
   a collection drum containing therein a plurality of translucent display elements that change position relative to one another upon rotation of the collection drum by moving within the collection drum, wherein the plurality of display elements are themed such that each one of the display elements has a front surface that is of a shape that resembles an object that is associated with the particular theme of the display elements;

a mirror structure mounted within the housing, wherein the mirror structure and the display elements of the collection drum are used for generating a decorative kaleidoscopic effect; and a driving system having a stepping motor configured for causing the collection drum to rotate, and wherein the driving system has control logic capable of actuating the stepping motor so as to vary the speed of the stepping motor and to intermittently drive the stepping motor, and wherein the collection drum is caused to be intermittently rotated and is caused to have varying rotation speeds based upon associated actuation of the stepping motor.

16. The kaleidoscopic device as set forth in claim 15, wherein the theme of the plurality of display elements is selected from the group consisting of a spiritual theme, a religious theme, an animal theme, a flower theme, a Thanksgiving theme, a Christmas theme and an Easter theme.

17. The kaleidoscopic device as set forth in claim 15, wherein the collection drum is configured to be opened by a user in order to replace the themed plurality of display elements with a new themed plurality of display elements.

18. The kaleidoscopic device as set forth in claim 15, wherein the wall is a wall of a structure, and wherein the housing extends from an exterior surface of the wall to an interior surface of the wall, and wherein the decorative kaleidoscopic effect is directed towards the interior of the structure.

* * * * *